United States Patent
Polivka

(10) Patent No.: US 7,855,541 B2
(45) Date of Patent: *Dec. 21, 2010

(54) METHOD AND APPARATUS TO CONTROL A POWER SUPPLY FOR HIGH EFFICIENCY

(75) Inventor: William M. Polivka, Campbell, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/714,335

(22) Filed: Feb. 26, 2010

(65) Prior Publication Data

US 2010/0156378 A1    Jun. 24, 2010

Related U.S. Application Data

(63) Continuation of application No. 11/963,664, filed on Dec. 21, 2007, now Pat. No. 7,696,737.

(51) Int. Cl.
*G05F 1/575* (2006.01)
*H02M 3/335* (2006.01)

(52) U.S. Cl. ............... 323/284; 323/351; 363/21.12

(58) Field of Classification Search ............ 363/16, 363/21.01, 21.04, 21.12, 97, 131; 323/284, 323/351
See application file for complete search history.

(56) References Cited

U.S. PATENT DOCUMENTS

| | | | |
|---|---|---|---|
| 5,469,349 A * | 11/1995 | Marinus | 363/21.08 |
| 6,198,245 B1 | 3/2001 | Du et al. | |
| 6,525,514 B1 | 2/2003 | Balakrishnan et al. | |
| 6,900,622 B2 * | 5/2005 | Balakrishnan et al. | 323/277 |
| 6,934,864 B2 | 8/2005 | Chu et al. | |
| 6,996,441 B1 | 2/2006 | Tobias | |
| 7,019,995 B2 | 3/2006 | Niemand et al. | |
| 7,233,504 B2 | 6/2007 | Djenguerian et al. | |
| 7,539,028 B2 * | 5/2009 | Baurle et al. | 363/19 |
| 7,696,737 B2 * | 4/2010 | Polivka | 323/284 |

* cited by examiner

*Primary Examiner*—Gary L Laxton
(74) *Attorney, Agent, or Firm*—Blakely Sokoloff Taylor & Zafman, LLP

(57) ABSTRACT

A power supply control circuit is disclosed. In one aspect, a power supply control circuit includes a controller to be coupled to a switch to regulate an output of a power supply in response to a feedback signal and a parameter change signal. A parameter response circuit is coupled to generate the parameter change signal in response to a difference between a first value of a parameter measured before an event and a second value of the parameter measured after the event. The difference between the first value of the parameter and the second value of the parameter is representative of the relative efficiency of the power supply.

8 Claims, 5 Drawing Sheets

METHOD AND APPARATUS TO CONTROL A POWER SUPPLY FOR HIGH EFFICIENCY

CROSS-REFERENCE TO RELATED APPLICATION

This application is a continuation of U.S. patent application Ser. No. 11/963,664, entitled "METHOD AND APPARATUS TO CONTROL A POWER SUPPLY FOR HIGH EFFICIENCY," filed on Dec. 21, 2007, which is hereby incorporated by reference.

BACKGROUND INFORMATION

1. Field of the Disclosure

The present invention relates generally to power supplies, and more specifically, the invention relates to power supply controllers.

2. Background

In general, a switched mode power supply controller regulates an output of the power supply by controlling the switching of a switch of the power supply. For instance, an example controller may regulate an output of the power supply by choosing whether or not to allow the switch to conduct current during each switching cycle. An enabled switching cycle is one in which the controller allows the switch to conduct. A disabled switching cycle is one in which the controller does not allow the switch to conduct. The controller produces a sequence of enabled and disabled switching cycles to regulate the output of the power supply.

In one type of controller, conduction of the switch terminates when the current in the switch reaches one of a plurality of current limit values. The controller chooses a particular current limit value in response to the sequence of past enabled and disabled cycles to avoid undesirable patterns in the sequence of enabled and disabled switching cycles. The undesirable patterns can generate audio noise from electrical and magnetic components. Also, such patterns can cause undesirable deviations in the regulated output, particularly when the regulated output is an output voltage.

The load of a power supply typically changes over a wide range. Each current limit value provides acceptable operation of the power supply over a limited range of load. The range of load associated with one current limit value overlaps the range of load assigned to an adjacent current value to assure smooth and stable operation over the entire range of loads. Therefore, two current limit values may provide acceptable operation for the same load.

The two current limit values correspond to two different modes of operation for the same load, each one with different conduction losses and different switching losses for the same load. The conduction losses and the switching losses reduce the efficiency of the power supply. Thus, the power supply may operate at different efficiencies for the same load, depending on which current limit value the controller selects for that load. Since such a controller may use a state machine, for example, to determine the current limit value from a sequence of enabled and disabled switching cycles, random changes in loading can produce different efficiencies for the same load.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
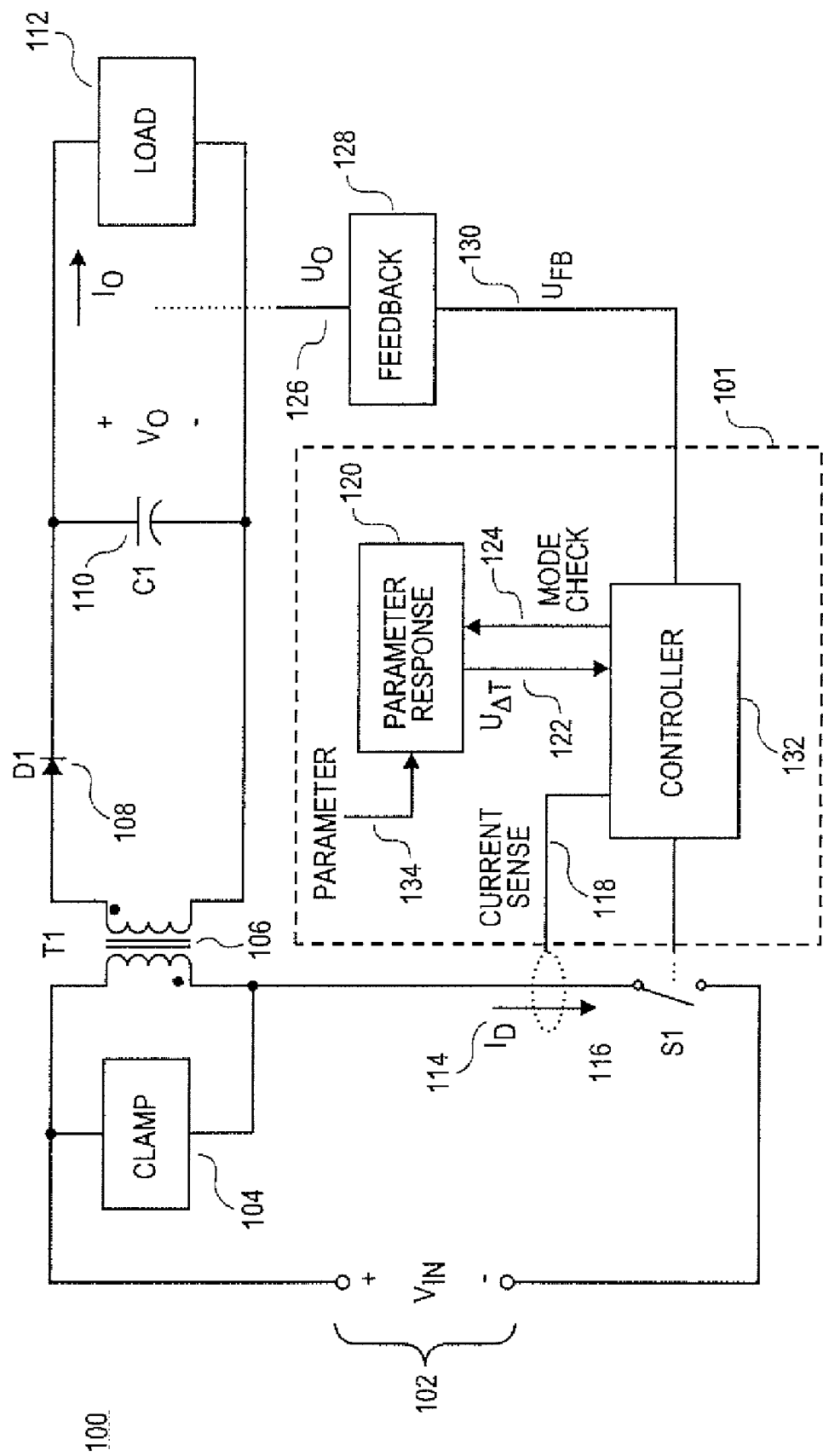
FIG. 1 shows generally one example of a block diagram of an example power supply in accordance with the teachings of the present invention.

Examples related to controlling a power supply for high efficiency in accordance with the present invention are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples. Furthermore, the particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will discussed, an example power supply controller in accordance with the teachings of the present invention selects a current limit that may be chosen from multiple current limit values. The current limit value that is chosen can allow the power supply to operate at a higher efficiency for a given load in accordance with the teachings of the present invention. In one example, a power supply controller uses a signal from a parameter response circuit to determine which current limit value of a plurality of current limit values provides a higher efficiency operation of a power supply. In one example, the parameter that is measured by the parameter response circuit can be any parameter that indicates an efficiency of the power supply, such as an analog electrical signal or an extrinsic parameter such as temperature.

In the example described herein, the parameter response circuit is a thermal response circuit and a parameter that is measured is a temperature. The power supply controller first selects a current limit value as usual to provide the desired regulated output while avoiding audio noise. Then the power supply controller checks an alternative current limit value and selects the value that gives the higher efficiency, repeating the check at intervals appropriate to the application.

In an example where the parameter response circuit is a thermal response circuit, after waiting a sufficient time for the power supply to reach a substantially constant temperature, the power controller changes the current limit value, alternating between a higher value and a lower value on subsequent checks. In one example, the power supply controller receives a signal from a thermal response circuit when the change in the current limit value produces an increase in temperature. An increase in temperature indicates a decrease in efficiency, so the controller returns the current limit to its previous value when it receives a signal from the thermal response circuit. In one example, a change in current limit value that does not produce an increase in temperature indicates either an increase in efficiency or no change in efficiency, so the current limit value remains at the new value when there is no signal from the thermal response circuit. The power supply controller initiates the checking operation again after a sufficient time for the power supply to again reach a substantially constant temperature.

It is appreciated that the described example is one of many possible combinations of power supply controllers and parameter response circuits in accordance with the teachings of the present invention. In another example, a controller that uses a different principle to regulate an output selects a switching frequency that may be chosen from multiple possible switching frequencies instead of selecting a current limit from a plurality of current limit values. Therefore, the switching frequency that is chosen in the example can allow the power supply to operate at a higher efficiency for a given load in accordance with the teachings of the present invention.

To illustrate, FIG. 1 shows generally one example of a block diagram of an example power supply with a regulated output in accordance with the teachings of the present invention. As shown, the example switching power supply is illustrated as a flyback power supply. It is appreciated that there are many known topologies and configurations of switching power supplies, and that the example flyback power supply illustrated in FIG. 1 is for explanation purposes and that the teachings of the present invention may also apply to other types of switching power supply topologies.

As shown, the example power supply illustrated in FIG. 1 provides output power to a load 112 from an unregulated input voltage $V_{IN}$ 102. The input voltage $V_{IN}$ 102 is coupled to an energy transfer element T1 106 and a switch S1 116. In the example of FIG. 1, the energy transfer element T1 106 is a coupled inductor, sometimes called a transformer, with two windings. In another example, the transformer may have more than two windings. For instance, additional windings may provide circuits of the power supply with bias power, signals, or the like. In the illustrated example, a clamp circuit 104 is coupled to the primary winding of the energy transfer element T1 106 to limit the maximum voltage on the switch S1 116. Switch S1 116 is opened and closed in response to a power supply control circuit 101, which in the illustrated example includes a controller circuit 132 coupled to a parameter response circuit 120. In one example, controller circuit 132 is an on/off controller. In another example, controller circuit 132 may be a pulse-width-modulated (PWM) controller. In the example, switch S1 116 is off and unable to conduct current when it is open. Switch S1 116 is on and able to conduct current when it is closed. In the example, a feedback circuit 128 is also coupled to controller circuit 132.

In one example, the power supply control circuit 101 may be comprised of an integrated circuit that is defined with the broken line shown in FIG. 1 including the controller circuit 132 and the parameter response circuit 120. In the specific diagram illustrated in FIG. 1, it is noted that the parameter response circuit 120 is a thermal response circuit and the parameter signal 134 that is received by the parameter response circuit 120 is a temperature signal. In other examples, it is noted that other suitable parameters responsive to the efficiency of the power supply may be received by the parameter response circuit in accordance with the teachings of the present invention.

In one example, parameter response circuit 120 may include a time-differential analog comparator or the like. Such an example time-differential analog comparator may include a source of a variable frequency signal having a frequency responsive to an analog input, such as the parameter signal 134. A counting circuit may be coupled to count cycles of the variable frequency signal. The counting circuit may be coupled to count in a first direction for a first time interval and may be coupled to count in a second direction opposite to the first direction for a second time interval that occurs after an end of the first time interval. An evaluation circuit may be coupled to the counting circuit. The evaluation circuit may be responsive to the count of the cycles of the variable frequency signal after an end of the second time interval. In other examples, it is appreciated that other types of parameter response circuits may be employed in accordance with the teachings of the present invention.

It is noted that in the illustration, the switch S1 116 and feedback circuit 128 are shown as being separate from power supply control circuit 101. It is appreciated that in another example, switch S1 and/or feedback circuit 128 may be included in the power supply control circuit 101 in accordance with the teachings of the present invention. In one example, power supply control circuit 101 may be implemented with a monolithic integrated circuit.

In one example, switch S1 116 includes a transistor. In one example, controller circuit 132 includes integrated circuits and discrete electrical components. The operation of switch S1 116 produces pulsating current in the rectifier D1 108. The pulsating current is filtered by capacitor C1 110 to produce a substantially constant output voltage $V_O$ that in turn produces an output current $I_O$ at the load 112.

As shown in the example, the output quantity to be regulated is $U_O$ 126, that in general could be an output voltage $V_O$, an output current $I_O$, or a combination of the two. A feedback circuit 128 is coupled to the output quantity $U_O$ 126 to produce a feedback signal $U_{FB}$ 130 that is received by the controller circuit 132. Another signal received by the controller circuit 132 is the current sense signal 118 that senses a current $I_D$ 114 in the switch S1 116. Any of the many known ways to measure a switched current, such as for example a current transformer, or for example the voltage across a discrete resistor, or for example the voltage across a transistor when the transistor is conducting, may be used to measure current ID 114. In the example, the controller circuit 132 opens the switch S1 116 when the current ID 114 in the switch S1 116 reaches a current limit.

As shown in the depicted example, a parameter response circuit 120 receives a parameter signal 134 and a mode check signal 124, providing a parameter change signal, which in FIG. 1 is a temperature change signal and is shown as parameter change signal $U_{\Delta T}$ 122, to the controller circuit 132. In the example, the parameter signal 134 is responsive to a temperature either within the power supply or external to the power supply, where the temperature is related to the power lost by the power supply. In one example, the parameter signal 134 is responsive to the temperature of a heatsink that extracts heat from a component of the power supply, such as for example a component of the power supply control circuit 101. In another example, the parameter signal 134 is responsive to a temperature external to the power supply, such as for example the temperature of the air removed from the power supply by a cooling fan. In yet another example, the parameter signal 134 is responsive to the temperature of a semiconductor device in an integrated circuit that includes the parameter response circuit 120. The parameter change signal $U_{AT}$ 122 responds to the difference in the parameter signal 134 before an event as compared to the parameter signal 134 after the event.

As will be discussed in greater detail below, the controller circuit 132 in one example uses the parameter change signal $U_{AT}$ 122 from the parameter response circuit 120 to indicate an increase or a decrease in efficiency of the power supply that results from a change in a mode of operation. The controller circuit 132 operates switch S1 116 to substantially regulate the output $U_O$ 126 to its desired value. In one example, the controller circuit 132 includes an oscillator that defines substantially regular switching periods $T_S$ during which the switch S1 116 may be conducting or not conducting. Regulation is accomplished by control of one or more switching parameters that determine the amount of energy transferred from the input to the output.

In one example, the controller circuit 132 determines whether or not the switch S1 116 will be allowed to conduct during each switching period $T_S$ in response to the feedback signal $U_{FB}$ 130. A switching period $T_S$ wherein the switch S1 116 is allowed conduct is an enabled period. A switching period $T_S$ wherein the switch S1 116 not allowed to conduct at any time during the period is a disabled period. In one example, the controller circuit 132 includes a state machine that uses the feedback signal 130 together with the sequence of past enabled and disabled periods to determine whether or not the switch will be allowed to conduct in a present switching period or in subsequent switching periods.

Figure 2A:
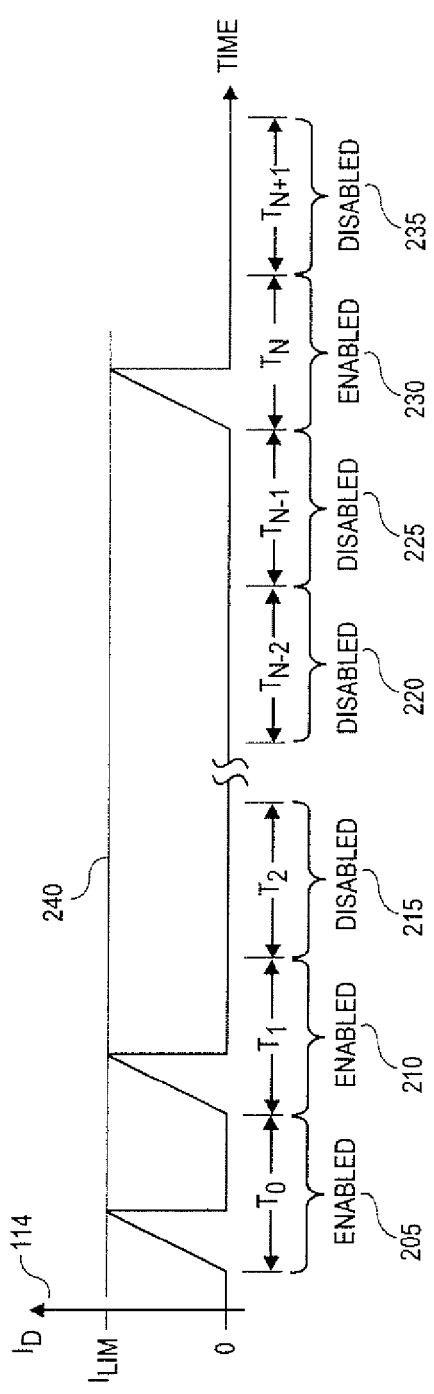
FIG. 2A shows an example waveform of a current in a switch for several enabled and disabled switching periods in an example power supply in accordance with the teachings of the present invention.
Figure 2B:
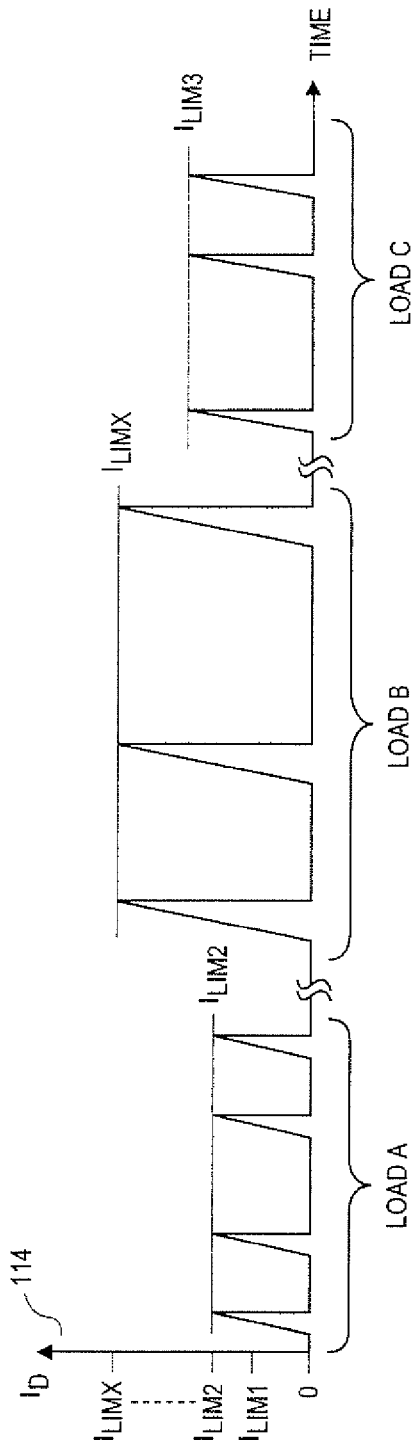
FIG. 2B shows an example waveform of a current in a switch for several different loads in an example power supply in accordance with the teachings of the present invention.

FIG. 2A shows an example waveform of a current in a switch for several enabled and disabled switching periods and FIG. 2B shows an example waveform of a current in a switch for several different loads in an example power supply in accordance with the teachings of the present invention. As shown, an example waveform of the current $I_D$ 114 in the switch S1 116 is illustrated in FIG. 2A for several enabled and disabled switching periods $T_S$ from $T_O$ 205 through $T_{N+1}$ 235. In the example of FIG. 2A, switch S1 116 turns on at the beginning of each enabled switching period 205, 210, and 230. Switch S1 116 conducts until the current $I_D$ 114 in switch S1 116 reaches a current limit $I_{LIM}$ 240. Switch S1 116 does not conduct in the disabled switching periods 215, 220, 225, and 235.

It is noted that the "triangle" shaped waveforms in FIGS. 2A and 2B show that the current ID 114 in the switch S1 116 is zero immediately after the switch S1 116 closes in each enabled switching period, confirming that the example power supply is operating in discontinuous conduction mode (DCM) in the illustrated examples. It is appreciated that the principles in accordance with the teachings of the present invention also apply to power supplies that operate in continuous conduction mode (CCM), where the waveform of the current $I_D$ 114 in the switch S1 116 would be a "trapezoid" shaped waveform rather than the "triangle" shaped waveforms illustrated in FIGS. 2A and 2B. The "trapezoid" shape would show that the current $I_D$ 114 in the switch S1 116 is not zero immediately after the switch S1 116 closes in each enabled switching period.

In one example, the controller circuit 132 may change the value of the current limit 240 in FIG. 2A to one of a plurality of discrete values to realize a desired characteristic of operation for different values of the load 112 as illustrated in the example shown in FIG. 2B. In one example, the controller circuit 132 selects the value of current limit 240 to avoid too many or too few enabled periods in a given time. For instance, the number of enabled periods in one second may be considered the effective frequency. In one example, it is desirable to prevent the effective frequency from falling within the audible range of human hearing.

Figure 3:
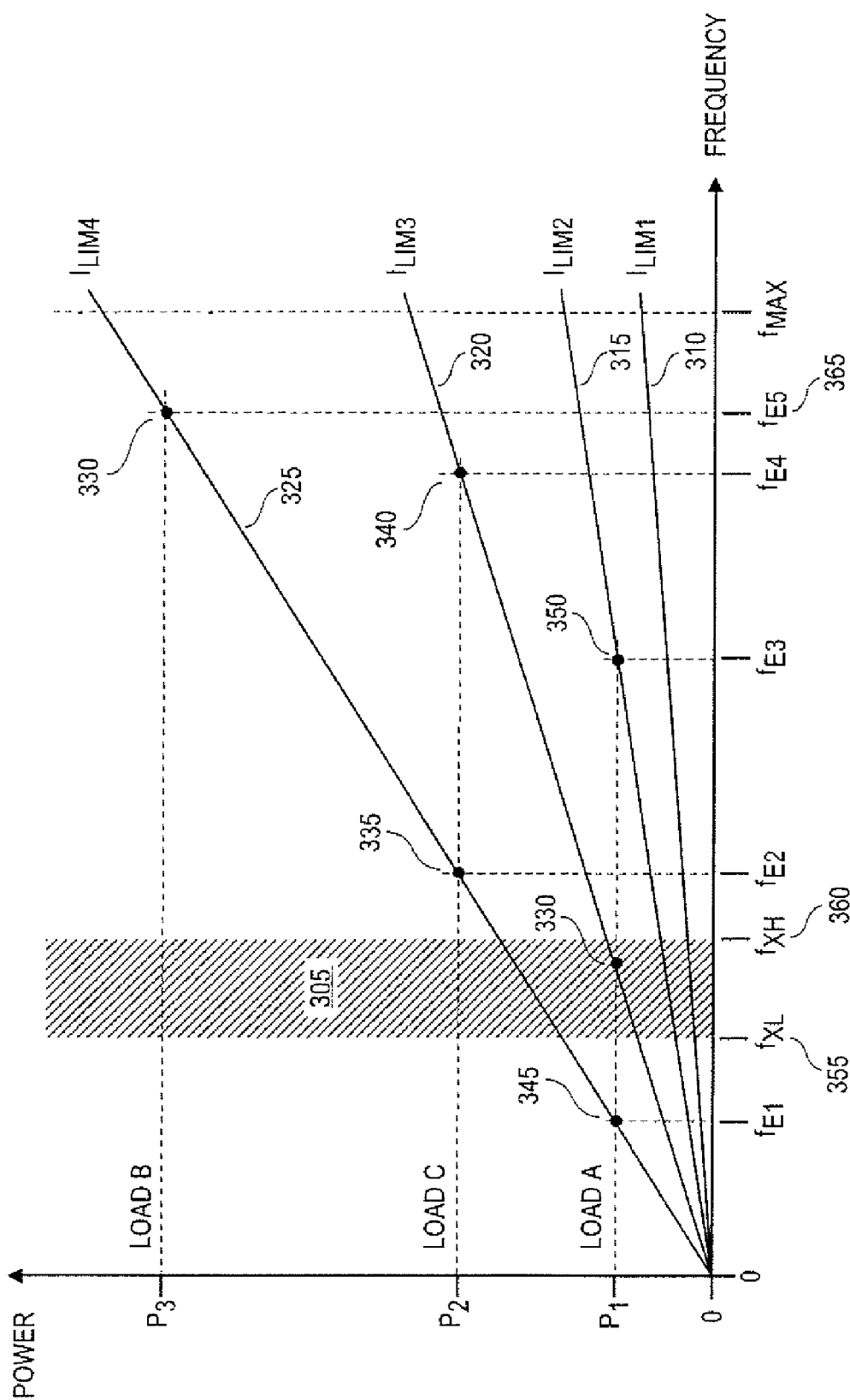
FIG. 3 is a graph that illustrates an example relationship between output power and effective switching frequency for an example power supply in accordance with the teachings of the present invention.

FIG. 3 is a graph that illustrates an example relationship between effective switching frequency and output power for an example power supply in accordance with the teachings of the present invention. In particular, the example shown in FIG. 3 illustrates the relationship between the effective switching frequency and the output power for an example power supply with a controller that has four values of the current limit 240. In an example flyback power supply operating in the discontinuous conduction mode, there is a linear relationship between the effective switching frequency and the output power for a given current limit value. FIG. 3 shows this relationship with the sloping lines 310, 315, 320, and 325, that correspond respectively to the current limit values $I_{LIM1}$, $I_{LIM2}$, $I_{LIM3}$, and $I_{LIM4}$. FIG. 3 shows a range of excluded effective frequencies 305 between a lower excluded frequency $f_{XL}$ 355 and a higher excluded frequency $f_{XH}$ 360. In this example, controller circuit 132 changes the current limit value to avoid the range of excluded effective frequencies 305.

Possible operating points for a given output power are shown in FIG. 3 where a horizontal line at the value of output power intersects one or more of the sloping lines 310, 315, 320, and 325 that correspond to the current limit values $I_{LIM1}$, $I_{LIM2}$, $I_{LIM3}$, and $I_{LIM4}$. To illustrate, to deliver the output power $P_3$ (that corresponds to load B in FIG. 2B), the controller must select the current limit value $I_{LIM4}$ in the example, since the sloping line 325 that corresponds to the current limit value $I_{LIM4}$ is the only one that intersects a horizontal line at the power $P_3$. The intersection at the point 330 corresponds to an effective frequency $f_{E5}$ 365.

FIG. 3 shows two operating points (335 on line 325 with current limit value $I_{LIM4}$, and 340 on line 320 with current limit value $I_{LIM3}$) can deliver the power $P_2$ that corresponds to load C in FIG. 2B. Similarly, the power $P_1$ corresponding to load A in FIG. 2B may be delivered either at operating point 345 with current limit value $I_{LIM4}$ or at operating point 350 with current limit value $I_{LIM2}$. Operating point 330 with current limit value $I_{LIM3}$ is not allowed to deliver the power $P_1$ because it falls within the range of excluded effective frequencies 305. In other examples, the controller circuit 132 may impose further restrictions on the range of loads that can have more than one operating point.

When multiple operating points are possible for a given load, it is desirable in one example to select the one that results in the highest efficiency. In this example, an indication of a change in temperature is used to select which of two operating points gives the higher efficiency. The efficiency is the output power divided by the input power, usually expressed as a percentage. The difference between the input power and the output power is the amount of power lost in the power supply.

In one example, when the power supply operates at higher efficiency, it loses less power in the form of heat. When the power supply operates at lower efficiency, it loses more power in the form of heat. The internal temperature of the power supply is related to the dissipation of lost power. Therefore, the temperature of the components of the power supply typically increases when more power is lost, indicating lower efficiency. Similarly, the temperature of the components of the power supply typically decreases when less power is lost, indicating higher efficiency.

Figure 4:
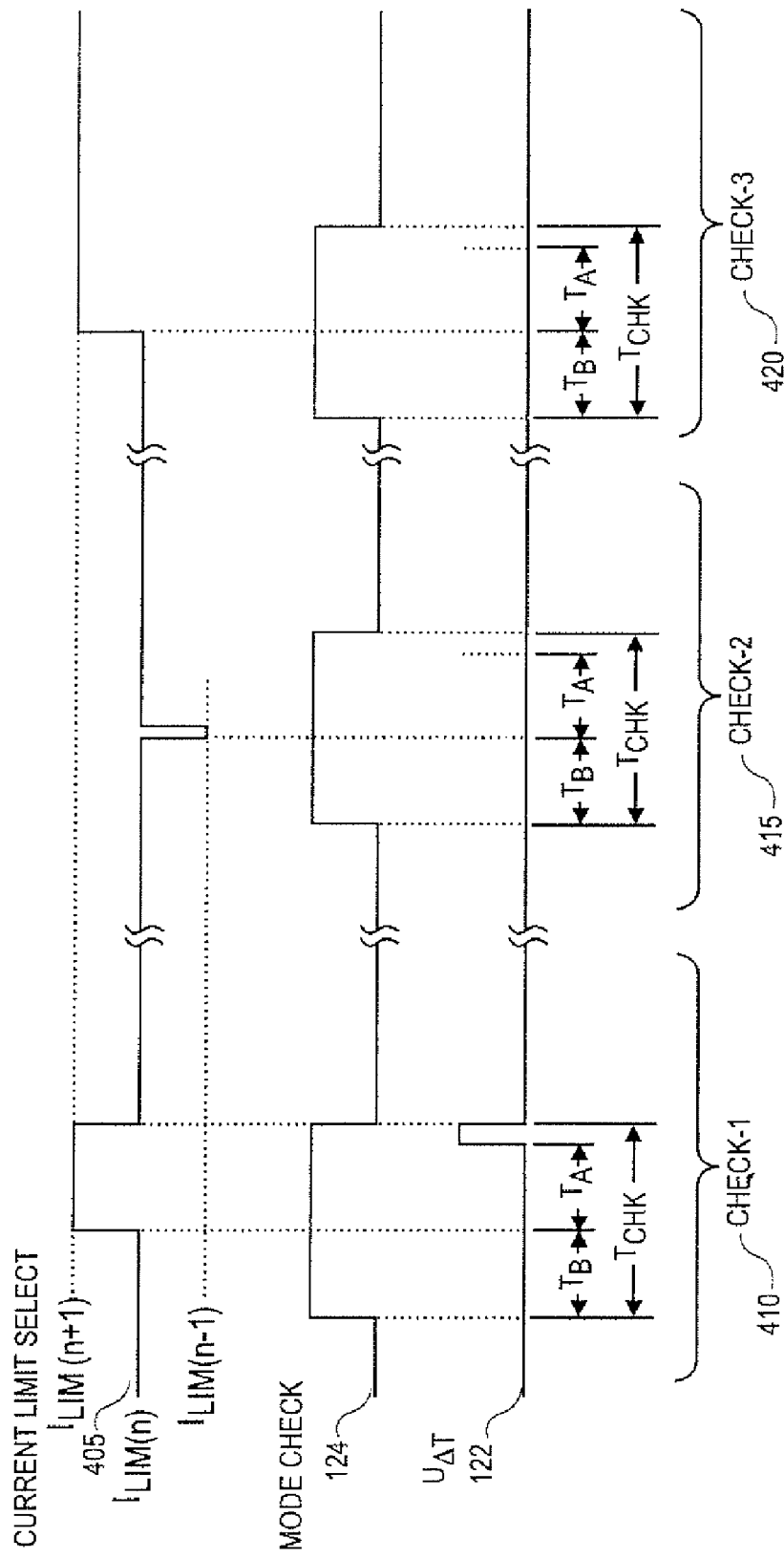
FIG. 4 is a timing diagram that shows a relationship of signals in an example power supply in accordance with the teachings of the present invention.

FIG. 4 is a timing diagram that shows a relationship of signals in an example power supply in accordance with the teachings of the present invention. As shown, the timing diagram shows three examples where the controller circuit 132 selects the current limit value 405 in response to parameter change signal $U_{AT}$ 122 from parameter response circuit 120. In the depicted example, the power supply is initially operating with a current limit value $I_{LIM(n)}$ 405 that represents an intermediate value of current limit that is neither the highest nor the lowest in the range of current limit values for the example controller circuit 132. During the time interval Check-1 410, the controller circuit 132 asserts a mode check signal 124 of duration $T_{CHK}$ that changes the mode check signal 124 from a first logic state to a second logic state. For example, FIG. 4 shows mode check signal 124 changing from a logic low state to a logic high state. After a time TB during $T_{CHK}$ that allows the parameter response circuit 120 to measure the parameter signal 134, the controller circuit 132 changes the current limit value from $I_{LIM(n)}$ to the next higher value $I_{LIM(n+1)}$. The controller reduces the effective switching frequency in response to the higher current limit to maintain the desired regulated output. The reduction in effective switching frequency reduces the switching loss, whereas an increase in current limit typically increases conduction loss. Therefore, the efficiency of the power supply can increase or decrease as a result of the change, depending on which of the two losses is greater.

The controller circuit 132 allows the current limit value to remain at the new value for a time $T_A$ during the time $T_{CHK}$. The time $T_A$ is long enough for a change in efficiency of the power supply to cause a change in temperature. After the time $T_A$ during the time $T_{CHK}$, the controller circuit 132 responds to a temperature change signal $U_{AT}$ 122 from the parameter response circuit 120. In one example, a logic high value of the temperature change signal $U_{AT}$ 122 indicates an increase in temperature corresponding to a lower efficiency for the power supply. In one example, a logic low value of the temperature change signal $U_{AT}$ 122 indicates no increase in temperature, corresponding to either a higher efficiency or to no change in efficiency. During the time interval Check-1 410 in the example of FIG. 4, a logic high value of the temperature change signal $U_{AT}$ 122 causes the controller circuit 132 to return the current limit 405 from the new value $I_{LIM(n+1)}$ to the original value $I_{LIM(n)}$ when the mode check signal 124 returns to a logic low. An increase in temperature indicating a reduction in efficiency can occur when the increase in conduction loss from higher current in the switch is greater than the decrease in switching loss at the reduced effective switching frequency.

Continuing with the example shown in FIG. 4, during the time interval Check-2 415, the controller circuit 132 changes the current limit value from $I_{LIM(n)}$ to the next lower current limit value $I_{LIM(n-1)}$. In the example shown, the current limit value $I_{LIM(n-1)}$ is too low to sustain the regulated output of the power supply, so the controller circuit 132 returns the current limit value to the original value $I_{LIM(n)}$ almost immediately. Thus, there is substantially no change in efficiency and substantially no change in temperature, so the temperature change signal $U_{AT}$ 122 remains low while the mode check signal 124 is high.

During the time interval Check-3 420, the input voltage 102 is higher than it was in the interval Check-1 410. The controller circuit 132 changes the current limit value again in the time interval Check-3 420 to the higher value $I_{LIM(n+1)}$. The efficiency does not go lower (the temperature does not increase) in response to the change in current limit value with the higher input voltage, so the temperature change signal $U_{AT}$ 122 stays low. The efficiency may not go lower with an increase in the value of current limit if the increase in conduction loss from higher current in the switch is offset by the decrease in switching loss at the reduced effective switching frequency. Such is likely to be the case at higher input voltages. Therefore, the controller circuit 132 keeps the current limit value at $I_{LIM(n+1)}$ when the mode check signal 124 returns to a logic low.

Figure 5:
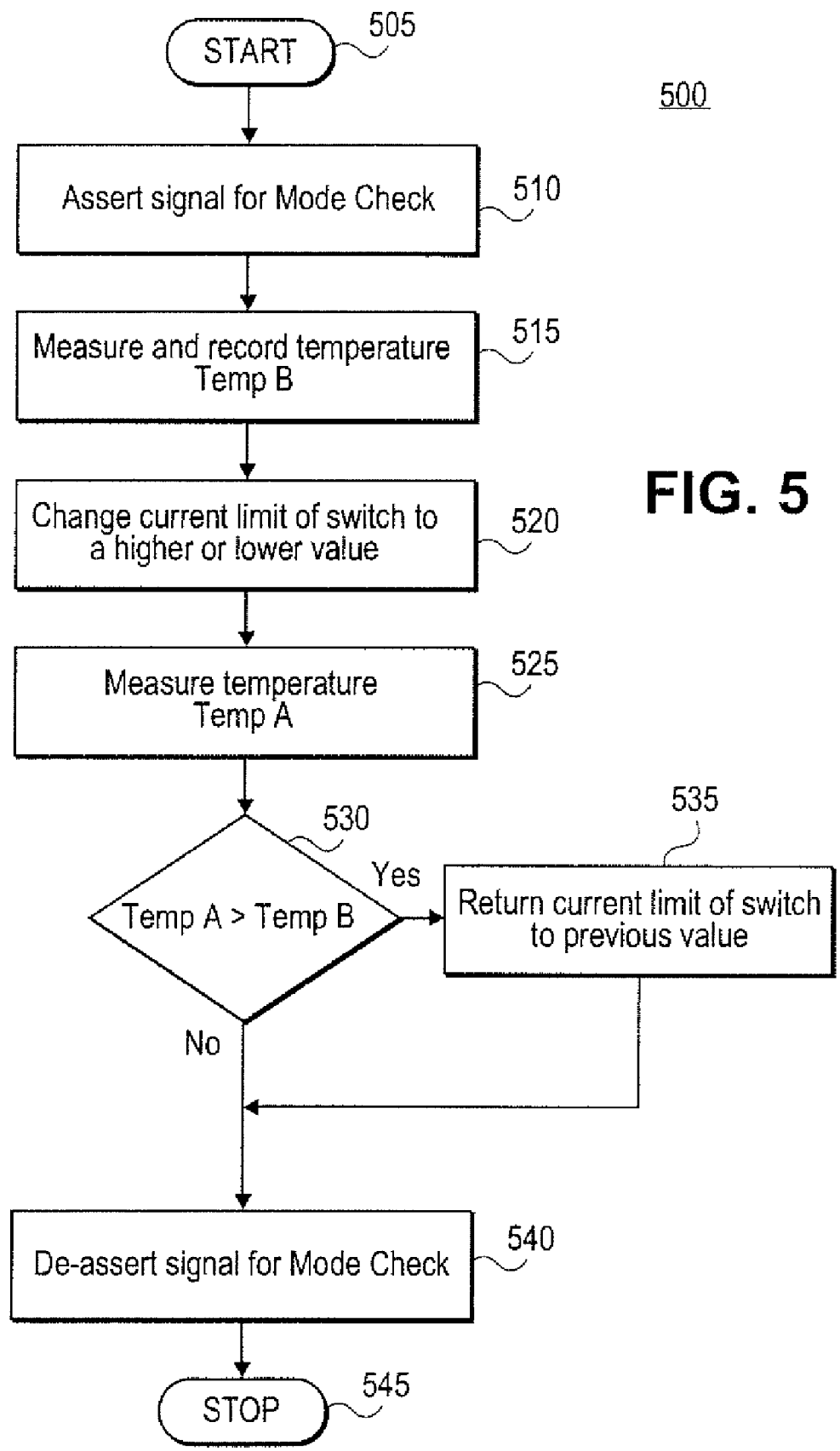
FIG. 5 is an example flow diagram that describes a method to control an example power supply in accordance with the teachings of the present invention.

FIG. 5 is shows an example flow diagram 500 that describes a method to control an example power supply in accordance with the teachings of the present invention. As shown, an example controller starts the process at block 505 either at regular intervals or when triggered by an event such as a change in the input voltage 102 or a change in the load 112. After starting in block 505, the controller asserts a mode check signal to assess an effect of a change in a mode of operation of the power supply. During the mode check, a first value of a parameter that is related to the efficiency of the power supply, such as for example a temperature, is measured and recorded as Temp B in block 515. Any of a number of known ways to measure and record the value of a signal may be applied to the operation of block 515 whether the signal is analog or digital. Analog signals may be sampled and held as an analog value with a sample and hold, or they may be converted to digital signals with an analog to digital converter for storage as digital data.

After the temperature Temp B is recorded in block 515, the current limit of the switch is changed in bock 520. In one example, the current limit is changed to a higher value on the first assertion of the mode check signal, and changed to a lower value on the next assertion of the mode check signal, alternating between higher and lower values on subsequent assertions of the mode check signal. In one example, the higher and lower values are the values nearest to the original value in the range of permissible values for the current limit.

The temperature is measured again as Temp A in block 525, and then compared with Temp B in block 530. In the illustrated example, if Temp A (after the change in mode) is greater than Temp B (before the change in mode), then the comparison indicates a decrease in the efficiency of the power supply, so the current limit of the switch is then returned to the value before the change in block 535. If Temp A is not greater than Temp B, then the current limit remains at the new value. In either case, the mode check event ends in block 540 when the controller de-asserts the mode check signal. The process stops at block 545.

In another example, where the parameter being measured to indicate the efficiency is not temperature, an increase in the value of the measured parameter may indicate an increase in the efficiency, the opposite of a change in temperature. In such examples, the current limit is returned to the value before the change in block 535 if the value of the measured parameter before the change current limit (Para B) is greater than the measured parameter after the change in current limit (Para A) in block 530. The decision of whether to return the current limit to the value before the change in block 535 is based on whether the particular parameter being measured, such as temperature, increases or decreases with respect to the efficiency of the power supply in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply control circuit, comprising:
   a controller to be coupled to a switch to regulate an output of a power supply, wherein the controller is coupled to open and close the switch at a switching frequency, wherein the controller is coupled to set the switching frequency to be one of a plurality of switching frequencies in response to a feedback signal and a parameter change signal; and
   a parameter response circuit coupled to generate the parameter change signal in response to a difference between a first value of a parameter measured before an event and a second value of the parameter measured after the event, wherein the difference between the first value of the parameter and the second value of the parameter is representative of the relative efficiency of the power supply.

2. The power supply control circuit of claim 1, wherein the event is a change in the switching frequency.

3. The power supply control circuit of claim 1, wherein the parameter response circuit is coupled to generate the parameter change signal in response to a mode check signal received from the controller.

4. The power supply control circuit of claim 3, wherein the mode check signal is generated at substantially regular intervals.

5. The power supply control circuit of claim 3, wherein the mode check signal is generated in response to a change in a condition external to the control circuit.

6. The power supply control circuit of claim 1, wherein the power supply control circuit is comprised in an integrated circuit.

7. The power supply control circuit of claim 1, wherein the first value of the parameter and the second value of the parameter are measured from a component included in the power supply control circuit.

8. The power supply control circuit of claim 1, wherein the parameter is a temperature.

* * * * *